United States Patent
Reymond

[11] 3,944,909
[45] Mar. 16, 1976

[54] VOLTAGE, CURRENT, OR POWER CONTROLLER UTILIZING A SWITCHED REACTANCE A.C. SHUNT REGULATOR

[76] Inventor: Welles K. Reymond, 131 Danbury Road, Wilton, Conn. 06897

[22] Filed: June 11, 1973

[21] Appl. No.: 369,083

[52] U.S. Cl. .................. 323/45; 323/8; 323/79; 323/81
[51] Int. Cl.² .............................................. G05F 7/00
[58] Field of Search ......... 323/6, 8, 45, 57, 60, 62, 323/91, 76, 79, 81; 321/20, 18

[56] References Cited
UNITED STATES PATENTS

| | | | |
|---|---|---|---|
| 1,843,745 | 2/1932 | Thompson | 323/45 |
| 3,209,239 | 9/1965 | D'Agostino | 323/76 X |
| 3,270,270 | 8/1966 | Yenisey | 321/18 |
| 3,312,891 | 4/1967 | McCabe et al. | 323/43.5 S |
| 3,370,223 | 2/1968 | Senetcen | 323/45 X |
| 3,408,558 | 10/1968 | Petersen et al. | 323/45 X |
| 3,470,444 | 9/1969 | Bixby | 321/20 X |
| 3,621,374 | 11/1971 | Kettler | 323/45 X |
| 3,778,699 | 12/1973 | Hoffman | 323/45 X |

Primary Examiner—Gerald Goldberg

[57] ABSTRACT

Apparatus is described that regulates the transfer of voltage, current, or power from an AC line to a load. The basic controller comprises an inductive element and a switch whose closing converts the inductive element from a series inductance between line and load to a step-down auto-transformer between line and load thus reducing the voltage available to the load and thereby reducing or terminating energy transfer to the load. The switch is connected in series with the inductive element and the combination of the switch and one winding of the auto-transformer is connected in parallel with the load. The controller can therefore be thought of as a switched reactance AC shunt regulator. Theoretically, shunt power in the controller is losslessly returned to the source. The controller is used to regulate any parameter related to the current through the load, the voltage across the load, or the power dissipated by the load simply by controlling the switch with any suitable means for sensing that parameter.

18 Claims, 3 Drawing Figures

VOLTAGE, CURRENT, OR POWER CONTROLLER UTILIZING A SWITCHED REACTANCE A.C. SHUNT REGULATOR

BACKGROUND OF THE INVENTION

In conventional AC to DC power supply circuits, conversion is typically achieved by charging a capacitor input filter through a full-wave rectifying circuit. See, for example, Section 7.4 in James F. Gibbons' *Semiconductor Electronics* (McGraw-Hill 1966). In a particular type of AC to DC power supply, switches such as silicon controlled rectifiers or triacs are used as regulating switches that are turned on to allow energy to be transferred to the load. See, for example, "AC Phase Control", *SCR Manual*, Section 9 (5th Edition, General Electric Co. 1972) and Stephen Prigozy's "The Use of Transformer Leakage Inductance as a Parameter for Optimizing the Performance of SCR Power Supplies" at pp. 288–292 of the *IEEE Journal of Solid-State Circuits*, Vol. SC-7, No. 4 (August 1972).

There are several shortcomings in these circuits and in particular in the ones which utilize capacitor input filters. Current flow is limited to a very small angle in a cycle of applied AC voltage. These small conduction angles produce a high peak-to-average current ratio. This requires a trade-off between the ability of the power controller to produce a regulated power output with a desired ripple and the performance ratings of the switch and transformer and the size of the capacitor. Other shortcomings include the generation of radio frequency line interference, the need for auxiliary starting circuitry for the switches, the fact that the switches must carry both the load current and any overload current that may be developed without any inherent limitation on the current, and the fact that the circuitry responds only slowly to changes in line and load, typically taking more than one cycle to respond.

SUMMARY OF THE INVENTION

In order to alleviate such problems in the design of apparatus for the control of voltage, current, or power, I have devised apparatus comprising an inductive element and a switch whose closing converts the inductive element from a series inductance between line and load to a step-down auto-transformer between line and load, thereby reducing the voltage available to the load and reducing or stopping energy transfer to the load. Advantageously, the inductive element comprises two closely coupled windings on a gapped, laminated structure that are additively connected to form a three terminal tapped choke. The first terminal is connected to one side of the AC line, the tap is connected to one side of the load, and the third terminal is connected through the switch to the other side of the AC line and the load, which are connected together. Thus, the switch is connected in series with the inductive element and the combination of the switch and one winding of the auto-transformer is connected in parallel with the load. This apparatus is used to regulate any parameter related to the voltage across the load, the current through the load, or the power dissipated by the load simply by controlling the switch with any suitable means for sensing that parameter.

When energy transfer to the load is desired, the switch is open and the AC line sees an inductor in series with the load. When it is desired to reduce or stop energy transfer to the load, the switch is closed, thereby reducing the voltage available to the load because of the step-down action of the auto-transformer formed by the two windings of the inductive element. Because this arrangement provides relatively large conduction angles, a circuit designer can avoid large capacitors or diodes having high peak and average current carrying capability. The fact that the circuit is controlled by a switch connected in parallel to the load has the added advantage that the switch does not carry the load current or any overload current that may be developed. Inasmuch as the switch is open when energy transfer is desired, there is no need for auxiliary starting circuitry for controlling the switch.

BRIEF DESCRIPTION OF THE DRAWING

These and other objects, features, and elements of my invention will be more readily apparent from the following detailed description of the drawing in which.

DETAILED DESCRIPTION OF THE DRAWING

Figure 1:
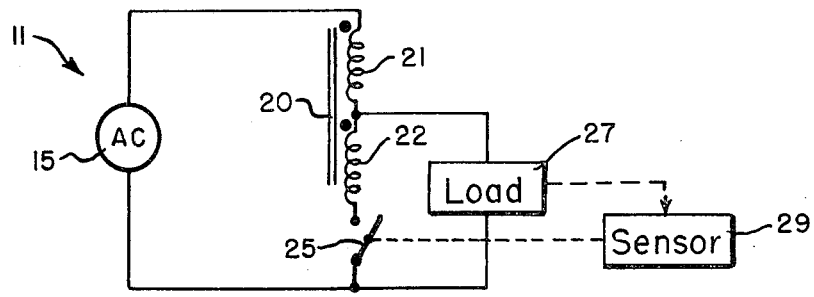
FIG. 1 is a block diagram of generalized apparatus for controlling voltage, current, or power in accordance with my invention.

Circuit 11 of FIG. 1 comprises an AC voltage source 15, an inductive element 20 comprising first and second windings 21, 22 having $N_1$ and $N_2$ turns, respectively, a switch 25, a load 27, and a sensor 29. Windings 21 and 22 are magnetically coupled and may constitute two windings on a tapped choke. As indicated by the dots, windings 21 and 22 are additively connected. Switch 25 provides essentially an open circuit when open and a short circuit when closed and illustratively is a triac. Sensor 29 is any appropriate device for monitoring a selected characteristic of circuit 11 such as the voltage across load 27, the current through the load, or the power being dissipated by the load. As indicated by the dotted line, it controls switch 25. Specifically, it closes switch 25 when a predetermined condition is reached. Load 15 may be any type of device operated by electrical energy such as a heating coil, lamp filaments, the windings on a motor, a plating tank, or a rectifier with a capacitor input filter.

When voltage source 15 is initially applied, switch 25 is open and the voltage sees an inductor, formed by winding 21, and load 27. As a result, the current through load 27 lags the voltage. When a predetermined load condition such as a voltage level or a temperature is reached during a half-cycle of the applied AC voltage, sensor 29 closes switch 25, thereby coupling winding 22 into the circuit forming a step-down auto-transformer. As will be understood by those skilled in the art, this converts the current in winding 21 into a magnetizing current in the step-down auto-transformer. For the period that switch 25 is closed, the auto-transformer reduces the voltage available to the load to some fraction $K = N_2/(N_1 + N_2)$ of the voltage available from source 15. The value of $K$ and the inductance of winding 21 are selected in accordance with the character of the load so that this step of closing switch 25 reduces the availability of power to the load.

For the example in which switch 25 is a triac, switch 25 remains closed until the current in winding 22 and switch 25 goes to zero. Usually, this condition is met in the half-cycle immediately following the half-cycle in which the switch was closed. Any stored energy in inductive element 20 due to magnetizing current that is present in the inductive element at the end of the half-cycle in which the switch is closed is put back into source 15 during the beginning of the following half-cycle. Once switch 25 is again open, the operation of circuit 11 as described above can be repeated.

Figure 2:
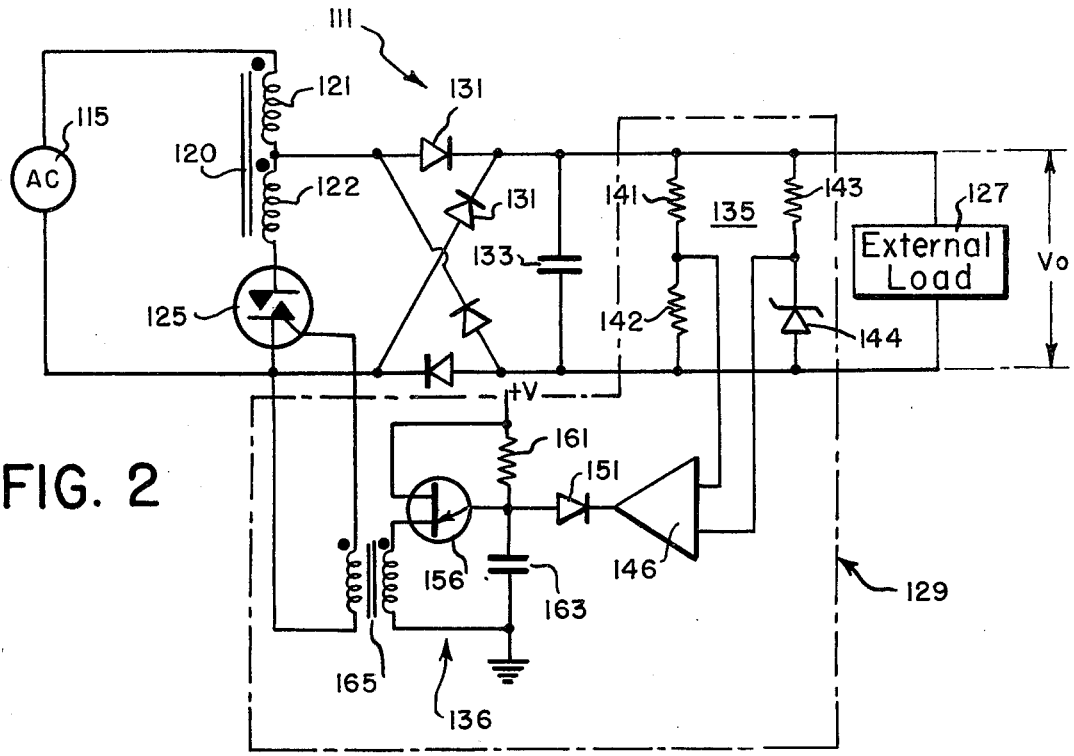
FIG. 2 is a schematic diagram of a first illustrative embodiment of my invention in an AC to DC power supply application.

FIG. 2 illustrates a more detailed circuit 111 that is used to provide a regulated DC voltage, $V_O$, from an AC source where the source voltage and load vary within known ranges. As in the case of circuit 11, circuit 111 comprises an AC voltage source 115, an inductive element 120 comprising first and second windings 121, 122 having $N_1$ and $N_2$ turns, respectively, a switch 125, an external load 127, and a sensor 129. Windings 121 and 122 are magnetically coupled and typically are two windings on a tapped choke. The number of turns $N_1$ and $N_2$ are chosen so that K times the peak of the source voltage is always less than the desired output voltage, $V_O$. Switch 125 is a triac. Load 127, sensor 129, a full-wave rectifying bridge comprising four diodes 131, and a capacitor 133 are connected across winding 122 and switch 125. Diodes 131 and capacitor 133 constitute a standard full-wave rectifier and capacitor input filter commonly utilized for AC to DC conversion.

In circuit 111, sensor 129 has the specific function of sensing the output voltage, $V_O$, across load 127 and generating a pulse to turn on triac 125 at the moment the load voltage, $V_O$, reaches a predetermined desired value. Sensor 129 is illustratively shown comprising the following functional elements: a conventional reference bridge 135, a differential amplifier 146, and a unijunction pulse oscillator 136. These elements perform the desired functions of reference generation, comparison, and triac firing to operate switch 125. Bridge 135 is connected in parallel with capacitor 133 and load 127. Bridge 135 comprises first, second, and third resistors 141, 142, 143 and a Zener diode 144 that provides a reference voltage. Two leads, one connected to the node between resistors 141 and 142 and the other connected to the node between resistor 143 and diode 144, connect these nodes to the inputs of differential amplifier 146. The output of this amplifier is connected through diode 151 to the emitter of unijunction transistor 156. The emitter is connected through a resistor 161 to a positive voltage supply that is also connected to one of the bases of unijunction transistor 156. The positive voltage supply may be derived from the load voltage, $V_O$. The emitter is also connected through capacitor 163 to ground. The other base of unijunction transistor 156 is connected to ground through the primary winding of a pulse transformer 165. The secondary winding of transformer 165 is connected to switch 125.

As illustrated, diode 151, resistor 161, capacitor 163, unijunction transistor 156, and transformer 165 constitute a well-known pulse oscillator 136 controlled by amplifier 146. Further details on this type of oscillator may be found in chapter 13 of the *GE Transistor Manual* (1964). If desired, numerous other oscillator circuits could be used in place of these elements. Transformer 165 provides isolation between the load and the AC signal input.

To understand the operation of the circuit, let us assume that the AC signal is increasing at the time voltage source 115 is first applied. The operation of the circuit under other conditions will be evident from this discussion to those skilled in the art. When voltage source 115 is initially applied, switch 125 is not conducting and the voltage sees winding 121, diodes 131 of the rectifying bridge, capacitor 133, sensor 129, and load 127. During the rising portion of the first half-cycle of the applied AC signal, capacitor 133 is charged through the inductance of winding 121 and the current at the node common to windings 121, 122 and two of diodes 131 increases with a phase delay relative to the voltage of the source 115. Inasmuch as the increase of voltage across capacitor 133 depends on this current, there is an additional lag in the increase in voltage across capacitor 133. At some point, preferably after the applied AC signal has reached its maximum and is declining, the voltage across capacitor 133 reaches the voltage level that sensor 129 has been set to detect. At this point, the output of amplifier 146 becomes positive, thereby turning off diode 151 and permitting the voltage applied to unijunction transistor 156 through resistor 161 to rise. As a result, an oscillation is set up in the oscillator circuit comprising unijunction transistor 156, resistor 161, capacitor 163, and the primary winding of transformer 165. This oscillation is coupled by transformer 165 to switch 125. The first pulse from the oscillator closes switch 125 by turning on the triac, thereby connecting winding 122 to the circuit and forming a step-down auto-transformer. As a result, the voltage applied to diodes 131 is immediately reduced to K times the source voltage. Inasmuch as K times the peak source voltage is always less than the desired output voltage, $V_O$, diodes 131 become reverse biased, thereby isolating capacitor 133, load 127, and sensor 129 from AC source 115. This effectively terminates energy transfer from the AC line to the load during the remainder of that half-cycle.

Thereafter, capacitor 133 discharges through load 127. As is well known in the art, capacitor 133 is ordinarily made as large as practical so that the time constant of the discharge is as high as possible. However, since diodes 131 remain conducting for a relatively large conduction angle during each half-cycle of the applied AC signal, the period of capacitor discharge is relatively short, thereby relaxing the requirements on the size of capacitor 133.

As will be understood by those skilled in the art, the number of amp-turns in windings 121, 122 just after switch 125 closes must be the same as the number of amp-turns in winding 121 just before switch 125 was closed. As a result, at the time switch 125 is closed, the load current from source 115 drops immediately and the load current in winding 122 is converted to magnetizing current in auto-transformer windings 121, 122. For the remainder of the half-cycle in which the switch 125 begins conducting, the applied AC signal continues to put energy into the auto-transformer in the form of magnetizing current. Once the next half-cycle of the applied AC signal begins, the transformer begins to return this energy to the AC signal source. At the point where all the energy stored in the auto-transformer has been returned to the AC input, the current through switch 125 goes to zero, thereby terminating conduction through the triac.

Preferably, the circuit parameters are selected so that the triac stops conducting before the magnitude of the applied AC source in the next half-cycle exceeds the voltage across capacitor 133 and turns on the appropriate pair of diodes 131 in the rectifying bridge. Once the diodes are switched on, the applied voltage again charges capacitor 133 through inductor 121. Again, the current through diodes 131 lags the applied AC signal and the increase in voltage across capacitor 133 is likewise delayed. When the voltage across the capacitor again reaches the voltage level monitored by sensor 129, the sensor closes switch 125. This immediately reduces the current from source 111 and the voltage across load 127, thereby reverse biasing diodes 131. The current that is in inductor 121 at the time switch 125 is turned on is converted into a magnetizing current in the step-down auto-transformer comprising magnetically coupled inductors 121, 122. During the remainder of this half-cycle, energy is stored in the auto-transformer. When the applied AC signal reverses itself at the start of the next half-cycle, this energy is returned to the AC signal source. Once all the energy is returned, the current through switch 125 goes to zero and conduction through the triac terminates. The operation of circuit 111 as described above is then repeated indefinitely.

Figure 3:
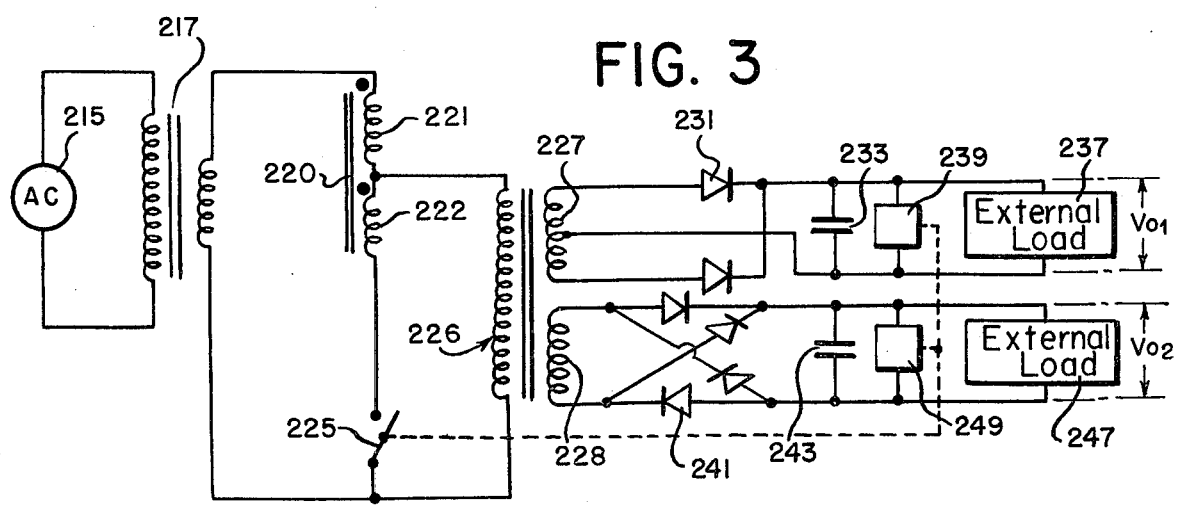
FIG. 3 is a schematic diagram of a second illustrative embodiment of my invention in an AC to DC power supply application.

Still another illustrative embodiment of the invention is shown as circuit 211 of FIG. 3. The purpose of this circuit is to provide two isolated, regulated DC voltages $V_{01}$ and $V_{02}$ from an AC source where the source voltage and loads vary within known ranges. This circuit comprises an AC voltage source 215, a stepping transformer 217, an inductive element 220 comprising first and second windings 221, 222, a switch 225, a coupling transformer 226 with first and second secondary windings 227, 228, and two load circuits. The first of these load circuits comprises rectifying diodes 231, a capacitor 233, a load 237, and a sensor 239. The second of these load circuits is similar and comprises a rectifying bridge using diodes 241, a capacitor 243, a sensor 249, and a load 247. As indicated by the dotted line between sensors 239 and 249 and switch 225, these sensors control the operation of switch 225. In practice, these sensors are connected in such a fashion that as soon as the voltage across capacitor 233 or the voltage across capacitor 243 exceeds a predetermined level switch 225 is closed.

The operation of the circuit of FIG. 3 will be evident from the description of the operation of the circuit of FIG. 2. Transformer 217 permits the voltage applied to the remainder of the circuit to be adjusted by stepping it up or down as required. Coupling transformer 226 can also be used to step the voltage up or down as desired in the particular load circuits to which it is connected. The operation of the second load circuit is the same as that shown in FIG. 2. The operation of the first load circuit is similar with the exception that a center-tap secondary winding and a pair of rectifying diodes are used to form the full-wave rectifier. The differences in operation will be apparent to those skilled in the art.

The selection of appropriate switches and sensors as well as capacitors and diodes, if any, will be apparent to anyone skilled in the art once the desired performance and the nature of the source and load are known. An illustrative calculation of the inductance $L_1$ of the first winding 121 in inductive element 120 of FIG. 2 and the step-down factor K follows. Determination of these parameters for other circuits of my invention will be apparent to those skilled in the art.

Inductance $L_1$ and factor K must be selected so that an operating condition is reached at which switch 125 is closed and they must also be selected so that the closing of switch 125 terminates current flow through diodes 131. Assume that the output of AC source 115 is $e(t) = E \sin \omega t$ with $\overline{E}$ being the maximum expected value and $\underline{E}$ being the minimum expected value. Assume that the load is a resistor R where $\overline{R}$ and $\underline{R}$ are its maximum and minimum expected values, respectively. Further assume that all elements are ideal. To ensure that an open switch will be closed, $L_1$ must be selected so that sometime with the switch open the voltage available will be greater than or equal to the desired output voltage, $V_0$, even under conditions of the lowest possible source voltage, $\underline{E}$, and greatest load current, i.e., minimum expected resistance, $\underline{R}$. To ensure that current flow through diodes 131 is terminated by closing switch 125, K must be chosen so that $K\overline{E}$ is less than or equal to the desired output voltage, $V_0$, under minimum load conditions, i.e., maximum expected resistance, $\overline{R}$.

The value of $L_1$ may be determined by first writing the integral equations for the ideal circuit with switch 125 open and solving these equations by conventional techniques with the aid of a computer. The capacitance of capacitor 133 may be assumed to be large enough that the peak-to-peak ripple may be ignored. The solution may conveniently be represented by a plot of values of $V_0/E$ versus $R/\omega L_1$. Representative values of the solution of these equations for a sinusoidal AC source are as follows:

| $V_0/E$ | $R/10^7 L_1$ |
|---|---|
| .55 | 1.71 |
| .60 | 2.39 |
| .65 | 3.44 |
| .70 | 5.08 |
| .75 | 7.94 |
| .80 | 13.38 |
| .85 | 25.56 |
| .90 | 61.57 |

The ratio $V_0/\underline{E}$ is then calculated for the desired output voltage, $V_0$, and the minimum expected voltage, $\underline{E}$, at the AC source; and the corresponding value of $\underline{R}/\omega L_1$ is read from the plot. Since $\underline{R}$ is known, $L_1$ can readily be determined. As will be evident, $L_1$ can be less than the inductance determined by this calculation. However, it is usually desirable to use an inductance that is quite close to this calculated value because lower values may prevent half-cycle response of the circuit.

The value of K may readily be determined from the condition $K\overline{E} \leq V_0$.

As an illustrative example, assume that:
$\overline{E} = 179$ volts (i.e., $\sim 115 \times 1.1 \times \sqrt{2}$)
$\underline{E} = 146$ volts (i.e., $\sim 115 \times 0.9 \times \sqrt{2}$)
$\overline{R}$ = infinite
$\underline{R} = 100$ ohms
$V_0 = 100$ volts
$\omega = 377$ (i.e., $2\pi 60$)
For these conditions, $K \leq V_0/\overline{E} = 100/179 = 0.56$. To determine $L_1$, $V_0/\underline{E} = 100/146 = 0.69$. By interpolation in the foregoing table, the corresponding value of $R/\omega L_1$ may be determined to be 4.75. Hence,
$L \leq R/4.75\omega = 100/4.75(377) = 0.056$ Henries.

As indicated, the foregoing analysis is for an ideal circuit. In practice, the Q of a realizable inductor is on the order of 10 to 20 instead of infinity as in the ideal case and voltage drops across diodes, and the like, must be taken into account. Thus, the complete circuit may be described by a set of integro-differential equations and these equations may be solved using known methods with the aid of a large computer. In the alternative, empirical measurements may also be made. However made, the relationship between $V_0/E$ and $R/\omega L_1$ is similar to the ideal case and the foregoing approach can be used with these more accurate values to calculate useful values of K and $L_1$.

As will be evident, numerous modifications may be made in the foregoing embodiments without departing from the spirit and scope of my invention. While it is preferred that the circuit parameters be selected to provide a maximum conduction angle for the diodes during each half-cycle, it will be appreciated that the invention can be operated using smaller conduction angles. The particular means for sensing a voltage level across the load and for closing switch 25 may readily be varied. It should be noted that the sensing means could, in the alternative, sense any parameter related to the voltage across the load, the current through the load, or the power being dissipated by the load. For example, sensing means could sense the light output from a load that constituted a light filament or it might sense the heat from a heating coil. Appropriate such means will be obvious to those skilled in the art. While it is contemplated that my invention will ordinarily be used to regulate an AC source that has a sinusoidal output, it will be understood that the invention may also be practiced with any alternating current source, sinusoidal or otherwise.

What is claimed is:

1. A controller for regulating the transfer of at least one of voltage, current, and power from an AC line to a load comprising:
   a first inductor, a second inductor, and a switch connected in series and shunting the AC line, said first and second inductors being additively magnetically coupled and said switch providing essentially an open circuit when open and a short circuit when closed;
   an output connected in parallel across said second inductor and switch, said switch preventing the flow of current in said second inductor when open and providing for the flow of current through said second inductor when closed so that at least one of the voltage, current or power available at the output is reduced when said switch is closed; and
   means responsive to a parameter related to at least one of the voltage, current and power available at said output for operating said switch when the monitored parameter reaches a predetermined level.

2. The controller of claim 1 further comprising means for storing a voltage developed across said second inductor and switch.

3. The controller of claim 2 wherein:
   the means for operating said switch comprises means for sensing said stored voltage and for triggering said switch when said voltage rises to said predetermined level; and
   the means for storing a voltage comprises:
   means for full wave rectifying the signal developed across the second inductor and switch; and
   a capacitor.

4. The controller of claim 1 wherein a transformer is interposed between the AC line and the output for stepping the voltage up or down.

5. The controller of claim 1 wherein said switch is a triac and the means for operating said switch comprises means for sensing a voltage level and for triggering said triac when said voltage reaches said predetermined level.

6. A controller that regulates the transfer of at least one of voltage, current, and power from an AC line to a load comprising an inductive element and a switch whose operation converts the inductive element from a series inductance between line and load to an auto-transformer, said switch providing essentially an open circuit when open and a short circuit when closed and being connected in series to the auto-transformer so that the switch and the auto-transformer shunt the AC line.

7. The controller of claim 6 further comprising an additional transformer interposed between line and load.

8. The controller of claim 6 wherein the auto-transformer is a tapped choke having first and second windings connected in series, the inductive element is one of said windings and the other of said windings and switch shunt the output.

9. The controller of claim 8 further comprising:
   means for full wave rectifying the signal developed across the winding and switch that shunt the output;
   a capacitor for storing said rectified signal;
   means for sensing the voltage stored in said capacitor, and
   means for triggering said switch when said voltage reaches a predetermined level.

10. A method of operating a power controller to produce a regulated output from an AC line comprising the steps of:
    interposing a series inductance between said output and the AC line;
    monitoring a parameter related to at least one of the voltage, current, or power available at said output;
    when said monitored parameter reaches a predetermined level, closing a switch to convert the series inductance to a step-down auto-transformer in which the auto-transformer shunts the AC line and a winding of the auto-transformer shunts the output, thereby stopping or reducing the transfer of power to the output and providing a path for returning energy stored in the auto-transformer to the AC line; and
    returning said switch to its initial condition at a subsequent time.

11. The method of claim 10 wherein the output includes a power storage element and the switch is returned to its initial condition after the power storage element has discharged to less than said predetermined value.

12. The method of claim 10 wherein the auto-transformer is a step-down auto-transformer and the step of operating the switch to convert the series inductance to an auto-transformer comprises the step of firing a triac and the step of returning said switch to its initial condition occurs when the current through the triac goes to zero.

13. A controller for regulating the transfer of at least one of voltage, current, and power from an AC line to a load comprising:
    a switch and a choke having first and second windings, said first and second windings and said switch being connected in series and shunting the AC line, said switch providing essentially an open circuit when open and a short circuit when closed;

an output connected in parallel across said second winding and switch, said switch preventing the flow of current in said second winding when open and providing for the flow of current through said second winding when closed; and means responsive to a parameter related to at least one of the voltage, current, and power available at said output for operating said switch when the monitored parameter reaches a predetermined level.

14. The controller of claim 13 wherein the output, second winding and switch are connected so at least one of the voltage, current, and power available at the output is reduced when said switch is closed.

15. The controller of claim 13 wherein the first and second windings of said choke provide the entire inductance shunting the AC line, with the exception of that resulting from any other transformers used to alter the amplitude of the AC voltage.

16. A controller for regulating the transfer of at least one of voltage, current, and power from an AC line to a load comprising:

a first inductor, a second inductor, and a switch connected in series and shunting the AC line, said first and second inductors being additively magnetically coupled and providing the entire inductance shunting the AC line with the exception of that resulting from any other transformers used to alter the amplitude of the AC voltage and said switch providing essentially an open circuit when open and a short circuit when closed;

an output connected in parallel across said second inductor and switch; and means responsive to a parameter related to at least one of the voltage, current, and power available at said output for operating said switch when the monitored parameter reaches a predetermined level.

17. The controller of claim 16 wherein the output, second inductor and switch are connected so at least one of the voltage, current, and power available at the output is reduced when said switch is closed.

18. The controller of claim 16 wherein said switch prevents the flow of current in said second inductor when said switch is open and provides for the flow of current through said second inductor when said switch is closed.

* * * * *